United States Patent
Miehlbradt et al.

(10) Patent No.: US 12,019,438 B2
(45) Date of Patent: Jun. 25, 2024

(54) TELEOPERATION WITH A WEARABLE SENSOR SYSTEM

(71) Applicant: ECOLE POLYTECHNIQUE FEDERALE DE LAUSANNE (EPFL), Lausanne (CH)

(72) Inventors: Jenifer Miehlbradt, Sion (CH); Fabio Isidoro Tiberio Dell'agnola, Faido (CH); Alexandre Cherpillod, Oron-le-Chatel (CH); Martina Coscia, Geneva (CH); Fiorenzo Artoni, Geneva (CH); Stefano Mintchev, Lausanne (CH); Dario Floreano, Lausanne (CH); David Atienza Alonso, Echandens-Denges (CH); Silvestro Micera, Geneva (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 694 days.

(21) Appl. No.: 16/973,303

(22) PCT Filed: Jun. 21, 2019

(86) PCT No.: PCT/IB2019/055237
§ 371 (c)(1),
(2) Date: Dec. 8, 2020

(87) PCT Pub. No.: WO2019/244112
PCT Pub. Date: Dec. 26, 2019

(65) Prior Publication Data
US 2021/0247758 A1    Aug. 12, 2021

(30) Foreign Application Priority Data
Jun. 22, 2018 (GB) .................................. 1810285.5

(51) Int. Cl.
*G05D 1/00* (2024.01)
*B64C 39/02* (2023.01)
(Continued)

(52) U.S. Cl.
CPC ......... *G05D 1/0016* (2013.01); *B64C 39/024* (2013.01); *G06F 3/011* (2013.01);
(Continued)

(58) Field of Classification Search
None
See application file for complete search history.

(56) References Cited

U.S. PATENT DOCUMENTS 5,155,684 A * 10/1992 Burke .................. G05D 1/0246
701/28
8,903,568 B1    12/2014 Wang et al.
(Continued)

FOREIGN PATENT DOCUMENTS

CN    103927761 A  *  7/2014
CN    204406085 U     6/2015
(Continued)

OTHER PUBLICATIONS

English Translation of CN103927761 (Year: 2014).*
(Continued)

*Primary Examiner* — Daniel L Greene
(74) *Attorney, Agent, or Firm* — Nixon & Vanderhye P.C

(57) ABSTRACT

A method for remotely controlling an operated unmanned object, comprises defining of a set of control movements of an operator; selecting of minimal necessary signals to reliably acquire the operator's control movements; defining of a mapping of the control movements to commands for the operated unmanned object; sensing of operator's body
(Continued)

movements; and transmitting of the minimal necessary signals corresponding to the operator's movements to the operated unmanned object.

9 Claims, 2 Drawing Sheets

(51) Int. Cl.
  B64U 10/13 (2023.01)
  G06F 3/01 (2006.01)
(52) U.S. Cl.
  CPC ............. *G06F 3/017* (2013.01); *B64U 10/13* (2023.01); *B64U 2201/20* (2023.01); *G05D 1/0038* (2013.01)

(56) References Cited

U.S. PATENT DOCUMENTS

| | | | |
|---|---|---|---|
| 9,283,674 B2 * | 3/2016 | Hoffman | B25J 13/06 |
| 9,582,080 B1 * | 2/2017 | Tilton | G06F 3/015 |
| 9,620,000 B2 | 4/2017 | Wang et al. | |
| 2008/0084385 A1 | 4/2008 | Ranta et al. | |
| 2009/0222149 A1 | 9/2009 | Murray et al. | |
| 2011/0109545 A1 * | 5/2011 | Touma | G06F 3/017 345/158 |
| 2011/0288696 A1 | 11/2011 | Lefebure | |
| 2011/0304650 A1 * | 12/2011 | Campillo | G06F 3/0304 345/175 |
| 2011/0312311 A1 | 12/2011 | Abifaker et al. | |
| 2012/0025946 A1 | 2/2012 | Chuang et al. | |
| 2013/0124891 A1 | 5/2013 | Donaldson | |
| 2013/0173088 A1 | 7/2013 | Callou et al. | |
| 2013/0181810 A1 | 7/2013 | Plotsker | |
| 2014/0111414 A1 | 4/2014 | Hayner | |
| 2015/0054630 A1 | 2/2015 | Xu et al. | |
| 2015/0140934 A1 | 5/2015 | Abdurrahman et al. | |
| 2015/0143601 A1 | 5/2015 | Longinotti-Buitoni et al. | |
| 2016/0189534 A1 | 6/2016 | Wang et al. | |
| 2016/0306434 A1 | 10/2016 | Ferrin | |
| 2016/0313801 A1 | 10/2016 | Wagner et al. | |
| 2016/0338644 A1 * | 11/2016 | Connor | A61B 5/1126 |
| 2017/0031446 A1 | 2/2017 | Clark | |
| 2017/0108857 A1 * | 4/2017 | Line | G06F 3/0484 |
| 2017/0174344 A1 * | 6/2017 | Lema | G06K 7/10 |
| 2017/0192518 A1 | 7/2017 | Hygh et al. | |
| 2017/0220119 A1 | 8/2017 | Potts et al. | |
| 2017/0259428 A1 | 9/2017 | Assad et al. | |
| 2018/0020951 A1 * | 1/2018 | Kaifosh | A61B 5/378 607/48 |
| 2019/0056725 A1 | 2/2019 | Su | |
| 2019/0258239 A1 * | 8/2019 | Floreano | A61H 1/0285 |
| 2021/0240984 A1 * | 8/2021 | Nishio | G06V 10/7784 |

FOREIGN PATENT DOCUMENTS

| | | |
|---|---|---|
| CN | 105005383 A | 10/2015 |
| CN | 105739525 A | 7/2016 |
| CN | 105955306 A | 9/2016 |
| CN | 106406544 A | 2/2017 |
| GB | 2415486 A | 12/2005 |
| JP | 2015-174192 A | 10/2015 |
| KR | 2016-0050863 A | 5/2016 |
| KR | 10-1658332 B1 | 9/2016 |
| KR | 2016-0105053 A | 9/2016 |
| WO | 2008/150062 A1 | 12/2008 |
| WO | 2015/200209 A1 | 12/2015 |
| WO | 2016/079774 A1 | 5/2016 |
| WO | 2016/167946 A1 | 10/2016 |
| WO | 2016/191050 A1 | 12/2016 |
| WO | 2017/052077 A1 | 3/2017 |
| WO | WO-2017146531 A1 * | 8/2017 ............ A63H 27/12 |
| WO | 2017/157313 | 9/2017 |

OTHER PUBLICATIONS

English Translation of WO 2017146531 A1 (Year: 2017).*
Artoni, Fiorenzo, et al., "RELICA: a method for estimating the reliability of independent components", Neuroimage, vol. 103, Dec. 2014, pp. 391-400.
Cauchard, Jessica R., et al., "Drone & Me: An Exploration Into Natural Human-Drone Interaction," Proceedings of the 2015 ACM International Joint Conference on Pervasive and Ubiquitous Computing, Sep. 2015, pp. 361-365.
Lupashin, Sergei, et al., "A platform for aerial robotics research and demonstration: The Flying Machine Arena," Mechatronics, vol. 24, No. 1, 2014, pp. 41-54.
Miyoshi, Kensho, et al., "Above Your Hand: direct and natural interaction with aerial robot," ACM SIGGRAPH 2014 Emerging Technologies, Aug. 2014, 1 page.
Peshkova, Ekaterina, et al., "Exploring User-Defined Gestures and Voice Commands to Control an Unmanned Aerial Vehicle," Intelligent Technologies for Interactive Entertainment, 2016, pp. 47-62.
Peshkova, Ekaterina, et al., "Natural Interaction Techniques for an Unmanned Aerial Vehicle System," IEEE Pervasive Computing, vol. 16, No. 1, Jan.-Mar. 2017, pp. 34-42.
Pfeil, Kevin P., et al., "Exploring 3D Gesture Metaphors for Interaction with Unmanned Aerial Vehicles, " Proceedings of the 2013 International Conference on Intelligent User Interfaces, Mar. 2013, pp. 257-266.
Sakamoto, Mizuki, et al., "Human Interaction Issues in a Digital-Physical Hybrid World," The 2nd IEEE International Conference on Cyber-Physical Systems, Networks, and Applications, 2014, pp. 49-54.
Sanna, Andrea, et al., "A Kinect-based natural interface for quadrotor control," Entertainment Computing, vol. 4, No. 3, 2013, pp. 179-186.
Waibel, Markus, "Controlling a Quadrotor Using Kinect," IEEE Spectrum: Technology, Engineering, and Science News, Jul. 2, 2011, http://spectrum.ieee.org/automaton/robotics/robotics-software/quadrotorinteraction 1 page.
International Search Report for PCT/IB2019/055237, mailed Sep. 26, 2019, 5 pages.
Written Opinion of the ISA for PCT/IB2019/055237, mailed Sep. 26, 2019, 6 pages.
Combined Search and Examination Report under Sections 17 & 18(3) dated Jan. 11, 2019, issued in United Kingdom Application No. GB1810285.5, 3 pages.

* cited by examiner

TELEOPERATION WITH A WEARABLE SENSOR SYSTEM

This application is the U.S. national phase of International Application No. PCT/IB2019/055237 filed 21 Jun. 2019, which designated the U.S. and claims priority to GB Patent Application No. 1810285.5 filed 22 Jun. 2018, the entire contents of each of which are hereby incorporated by reference.

TECHNICAL FIELD

The invention relates to a device and a method for gesture-based teleoperation.

BACKGROUND

Teleoperated robots, including for example unmanned aerial vehicles (UAVs or drones), have been increasingly used for the exploration of unsafe or difficultly accessible areas. Current control methods imply the use of third-party devices, which use predefined actions and rely on unnatural mappings between the pilot's movements and the actions of the aircraft. Extensive training is therefore required and the control of such a device requires the operator's full attention.

Alternative, more intuitive control approaches reduce the time before expertise and allow the operator to perform secondary tasks in parallel to the steering, such as, a visual exploration of the robot's environment by means of an embedded camera. Such approaches have been taken in recently developed gesture-based interfaces. However, these recently developed systems employ patterns established in advance and may therefore not implement the most intuitive control mapping for each user.

In the field of gesture-based teleoperation, a number of patent publications describe wearable systems for the distal control of a robot.

US2016306434 A1 presents an interface in the form of a smart watch, a smart ring or bracelet or a handheld device. The method implemented under the interface allows to combine inputs of different natures and to customize a set of poses to interact with the controlled device;

US2009222149 A1 describes a method to control flying robots by tracking of the operator's body movements using an optical tracking system.

Furthermore, a number of scientific publications address the question of user-friendly and intuitive control gestures in the case of drone steering:

Pfeil, Koh, and LaViola 2013 explores different 5 different predefined gesture-based interaction strategies; and
the 3 publications Cauchard et al. 2015, Ekaterina Peshkova, Hitz, and Ahlstrnm 2016, and E. Peshkova, Hitz, and Kaufmann 2017 survey spontaneous interaction gestures in a Wizard-of-Oz approach, yet without implementing these gestures for a closed-loop control.

Besides, the usability of predefined gestures to control drones has been demonstrated in several works:

Miyoshi, Konomura, and Hori 2014 used two on-board cameras to detect hand gestures which were translated into control commands for a quadcopter;
Sanna et al. 2013 and Sakanoto et al. 2014 used a Kinect to detect torso and arm gestures, or body postures for the control of a quadcopter;
Lupashin et al. 2014 and Waibel 2011 also used a Kinect to detect the user's gestures, which are continuously translated into velocity commands for a quadcopter;

whereby these approaches rely on a discrete decoder instead of a continuous mapping of the user's gestures to the drone's actions, thus limiting the versatility of the control and reducing the immersion experienced by the user.

In the field of optimization of sensor use and power consumption for a wearable control interface, there are for example two patent publications, wherein:

U.S. Pat. No. 9,620,000 provides a method for balancing recognition accuracy and power consumption; and
KR20160050863 provides a motion recognition technology.

SUMMARY OF THE INVENTION

The problem of using a standard remote controller is that the user has to learn how to control a distal robot. The present invention aims to provide a wearable remote controller that learns how the user wants to control a distal robot. Therefore, one aim of the present invention is to provide a device and a method for an improved intuitive control mapping.

Accordingly, in a first aspect, the invention provides a method for remotely controlling an operated unmanned object, comprising:

a. defining of a set of control movements of an intended operator;
b. selecting of minimal necessary signals to reliably acquire the control movements from the operator;
c. defining of a mapping of the control movements to commands for the operated unmanned object;
d. sensing of operator's body movements; and
e. transmitting of the minimal necessary signals corresponding to the operator's movements to the operated unmanned object.

In a preferred embodiment, the defining of the set of control movements comprises a definition of gestures of different body parts.

In a further preferred embodiment, the defining of the set of control movements comprises a recording of the movements performed by at least one operator observing the operated unmanned object or a virtual representation thereof executing the desired behaviors while executing control movements corresponding to the desired behaviors.

In a further preferred embodiment, the operator chooses the set of movements corresponding to the different actions of the operated unmanned object.

In a further preferred embodiment, the defining of the set of control movements comprises a recording of the movements performed by at least one operator observing the operated unmanned object or a virtual representation thereof executing the desired behaviors while executing control movements corresponding to the desired behaviors. The operator chooses the set of movements corresponding to the different actions of the operated unmanned object. The method further comprises determining a minimum set of signals necessary to efficiently acquire and discriminate the movements of the operator using non-negative sparse principal component analysis.

In a further preferred embodiment, the method further comprises determining a mapping of the operator's movements to the behaviors of the operated unmanned object.

In a further preferred embodiment, the step of sensing of operator's body movements comprises using at least one inertial measurement unit. The method further comprises determining a subset of discriminant inertial measurement units amongst the inertial measurement units from which gesture data results in at least one command, identifying a maximum frequency recorded by the subset discriminant inertial measurement units; turning off the remaining inertial measurement units which do not provide any discriminant feature; and reducing a sampling frequency of the subset of inertial measurement units to a double of the maximum frequency.

In a second aspect, the invention provides a network of wearable sensors to control of distal robots by at least a command, comprising
  a. a transmission unit (COM) configured to send the at least one command to the robot;
  b. a microcontroller unit (MCU) configured to perform real-time processing;
  c. at least one inertial measurement unit (IMU) connected to the microcontroller and configured to capture gesture from an intended user and output corresponding gesture data;
  wherein the real-time processing comprises processing the gesture data and translating it into the at least one command, adapting the mapping between the user's gestures and the at least one command.

In a further preferred embodiment, the network comprises power consumption control means configured to minimize a power consumption of the inertial measurement units by:
  a. determining a subset of discriminant inertial measurement units amongst the inertial measurement units from which gesture data results in at least one command,
  b. identifying a maximum frequency recorded by the subset discriminant inertial measurement units;
  c. turning off the remaining inertial measurement units which do not provide any discriminant feature; and
  d. reducing a sampling frequency of the subset of inertial measurement units to a double of the maximum frequency.

BRIEF DESCRIPTION OF THE DRAWINGS

The invention will be understood better through the description of example embodiments and in reference to the drawings, wherein.

Same references will be used to designation same of similar objects throughout the figures and the description.

DETAILED DESCRIPTION OF EXAMPLE EMBODIMENTS OF THE Invention

Figure 1:
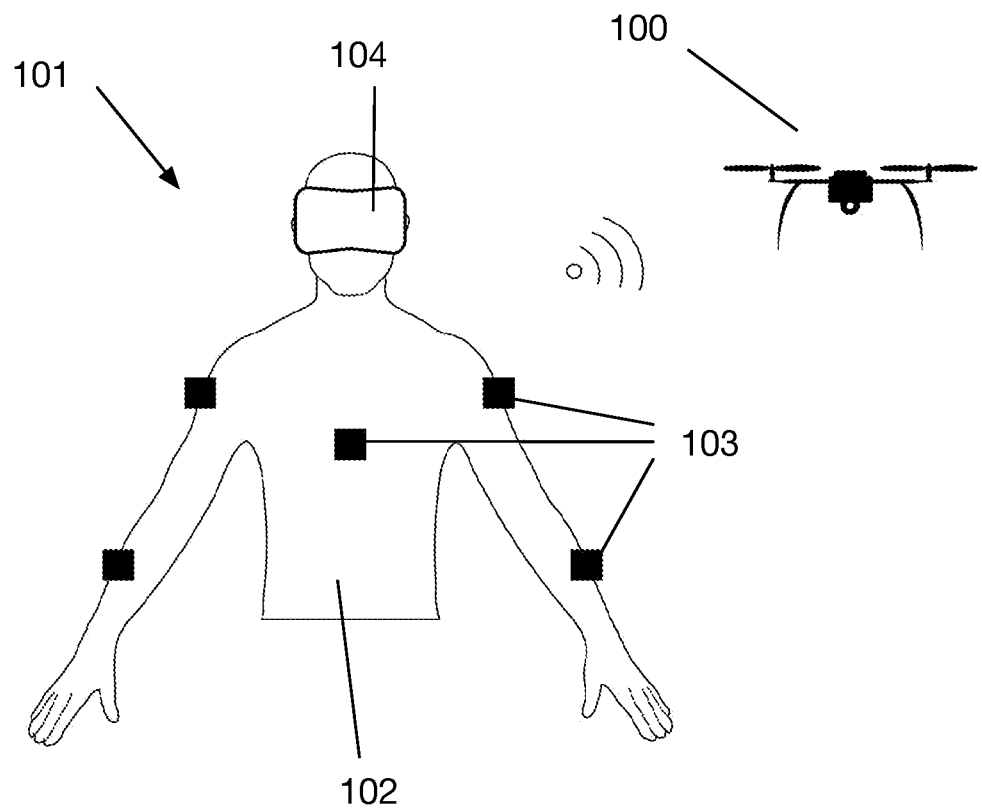
FIG. 1 shows an example of sensor configuration on the body of an operator according to the invention, in which a first-person view as visual feedback is provided through a head-mounted display.

FIG. 1 shows a schematic representation of an example sensor configuration according to the invention for a control of a flying robot 100. An operator 101 wears on his/her body 102 a possible sensor configuration 103, and a head-mounted display 104 through which a first-person view visual feedback is provided.

Hence, the invention provides at least a wearable interface—in FIG. 1 this comprises the sensor configuration 103—for an immersive and gesture-based control of at least a distal robot—in FIG. 1 this is the flying robot 100.

In addition, the invention provides a methodology to determine
  1) a data-driven user-friendly set of control gestures,
  2) to adapt the mapping to each user, and
  3) to minimize the data transmission from each sensor in order to minimize the overall power consumption.

Wearable Control Interface

Figure 3:
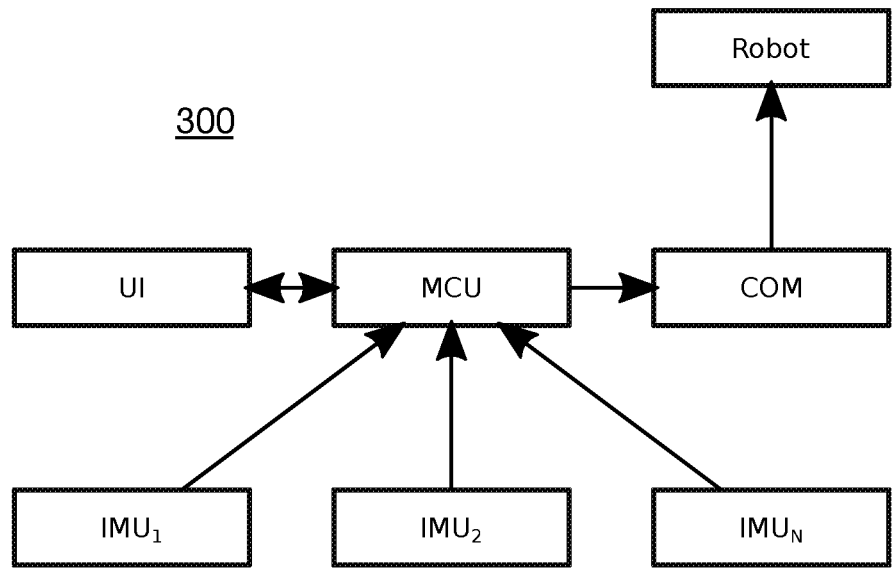
FIG. 3 contains a schematic of a wearable system according to an example embodiment of the invention.

Referring now to FIG. 3, this shows a schematic of an example wearable system 300, i.e., a wearable body sensor network for intuitive and natural control of distal robots. The wearable system 300 comprises a Transmission Unit (COM) to send the command to the robot (Robot), a Microcontroller Unit (MCU) for real-time processing, and a plurality, but at least one Inertial Measurement Units (IMUs) $IMU_1$, $IMU_2$, $IMU_N$ connected to the Microcontroller Unit for gesture monitoring. The Inertial Measurement Units are intended to capture gesture from a user (not shown in FIG. 3). Gesture data (not shown in FIG. 3) is acquired by the Inertial Measurement Units and transmitted to the Microcontroller Unit, where the gestures are recognized and translated into one or more commands (not shown in FIG. 3) for the robot. Finally, the commands are transmitted to the robot by means of the Transmission Unit (COM).

The user may access different functionalities (not shown in FIG. 3) of the system 300, e.g., normal use, gesture recording and adaptation, with a specific User Interface (UI). The Inertial Measurement Units may be located on the torso, on the upper arms, and on the forearms of the intended user, as shown in FIG. 1. Such locations are selected as they are the sites from which to collect data for the purpose of upper-body gesture monitoring.

Figure 2:
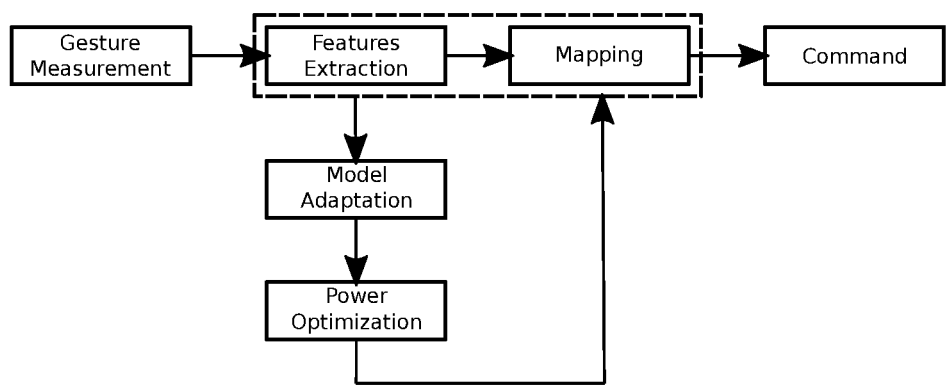
FIG. 2 contains a general flow diagram of the method for gesture-based teleoperation according to an example embodiment of the invention.

FIG. 2 shows a flow diagram describing the architecture of the wearable system. The gestures of the user are recorded with the sensors 103 from FIG. 1 (Gestures Measurement box). Only the relevant features are extracted from the gestures (Features Extraction box) and provided to a mapping model (Mapping box). This model translates the gestures of the user into commands for the robot 100 of FIG. 1 (Command box). The mapping model is designed based on the method described in the following section. The wearable system also includes an adaptation method (Model Adaptation box) and a power optimization method (Power Optimization box). The adaptation method consists of a personalization of the mapping model for a more intuitive and user-specific interaction with the robot (see corresponding section below). The optimization method handles the sensor usage reducing the power consumption of the system (see corresponding section below). The result of both adaptation and optimization is a new and personalized human-robot interaction model (Mapping box) that allows an even more immersive interaction with the robot. Finally, the robot is controlled using the personalized system.

User-Specific, Data-Driven Determination of a Gesture-Based Control Strategy and Minimal Necessary Sensor Coverage This section describes a method implemented in the wearable system, configured to adapt the optimal set of gestures for a user-specific interaction and control of a distant robot. The method is described in FIG. 4.

The method allows to select an optimal set of gestures to interact with and control a distant robot, and to minimize the number, type and positioning of the sensors necessary to detect the users' intentions, comprises:

1. an acquisition of the gestures (Gesture recording box) that at least one potential user wants to be linked with relative commands (Command selection box). The commands are defined by the degree of freedom of the robot (not shown in FIG. 4);
2. a selection of the relevant signals using Reliable Independent Component Analysis (RELICA) for dimensionality reduction. The RELICA method is described in the publication <<RELICA: a method for estimating the reliability of independent components>> by Artoni, F., Menicucci, D., Delorme, A., Makeig, S. & Micera, S, NeuroImage 103 (2014, p. 391-400, 16 Sep. 2014;
3. a definition of a mapping of the user's movements to the behaviors of the robot using Linear Discriminant Analysis (LDA) for the classification of discrete commands or Linear Regression for a continuous mapping; and
4. a calculation of the gains of the mapping strategy (Mapping Gains Adaptation box) with a linear regression based on steady-state positions and symmetries of the gestures.

Optimization of Sensor Usage and Power Consumption

This section describes a further method included in the wearable system, configured to optimize sensor—inertial measurement unit—usage in order to reduce the power consumption. The dynamics of the gestures may be different from user to user. Therefore, a user-specific optimization of the sensor usage may reduce the power consumption of the system.

Figure 4:
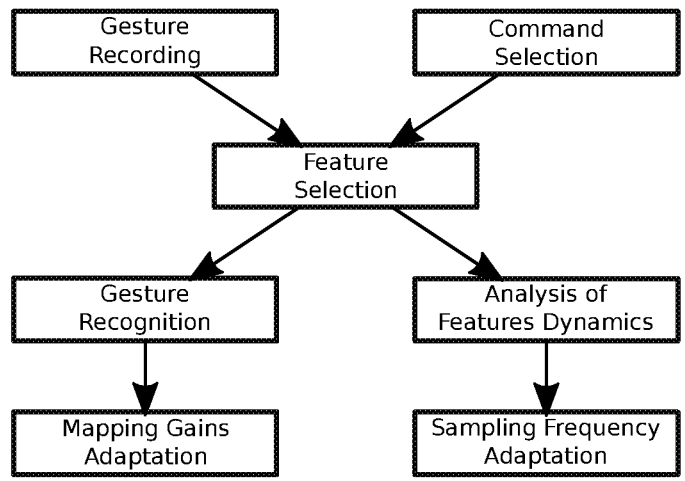
FIG. 4 contains a schematic of an adaptation and optimization algorithm according to an example embodiment of the invention.

The method used to optimize sensor usage is shown in FIG. 4, implemented through power consumption control means (not shown in FIG. 4) and described in the following.

Once the desired gestures have been recorded, discriminant sensors, in particular the features extracted from those sensors, are identified online.

At this point, the dynamics of the features are analyzed and the highest frequency (f) of each sensor is identified (Analysis of Features Dynamics box). Then, according to Shannon's definition of sampling that the sampling frequency (fs) must be greater than the Nyquist sample rate, i.e., fs>2 f, the sampling frequency of each sensor is settled accordingly (Sampling Frequency Adaptation box). All the sensors not providing discriminant features are turned off.

REFERENCES

Cauchard, Jessica R., Jane L. E, Kevin Y. Zhai, and James A. Landay. 2015. "Drone & Me: An Exploration into Natural Human-Drone Interaction." In Proceedings of the 2015 *ACM International Joint Conference on Pervasive and Ubiquitous Computing,* 361-365. UbiComp '15. New York, NY, USA: ACM. https://doi.org/10.1145/2750858.2805823.

Lupashin, Sergei, Markus Hehn, Mark W. Mueller, Angela P. Schoellig, Michael Sherback, and Raffaello D'Andrea. 2014. "A Platform for Aerial Robotics Research and Demonstration: The Flying Machine Arena." *Mechatronics* 24 (1):41-54. https://doi.org/10.1016/j.mechatronics.2013.11.006.

Miyoshi, Kensho, Ryo Konomura, and Koichi Hori. 2014. "Above Your Hand: Direct and Natural Interaction with Aerial Robot." In *ACM SIGGRAPH* 2014 *Emerging Technologies,* 8:1-8:1. SIGGRAPH '14. New York, NY, USA: ACM. https://doi.org/10.1145/2614066.2614086.

Peshkova, E., M. Hitz, and B. Kaufmann. 2017. "Natural Interaction Techniques for an Unmanned Aerial Vehicle System." *IEEE Pervasive Computing* 16 (1):34-42. https://doi.org/10.1109/MPRV.2017.3.

Peshkova, Ekaterina, Martin Hitz, and David Ahlström. 2016. "Exploring User-Defined Gestures and Voice Commands to Control an Unmanned Aerial Vehicle." In *Intelligent Technologies for Interactive Entertainment,* 47-62. Springer, Cham. https://doi.org/10.1007/978-3-319-49616-0_5.

Pfeil, Kevin, Seng Lee Koh, and Joseph LaViola. 2013. "Exploring 3D Gesture Metaphors for Interaction with Unmanned Aerial Vehicles." In Proceedings of the 2013 *International Conference on Intelligent User Interfaces,* 257-266. IUI '13. New York, NY, USA: ACM. https://doi.org/10.1145/2449396.2449429.

Sakamoto, M., A. Yoshii, T. Nakajima, K. Ikeuchi, T. Otsuka, K. Okada, F. Ishizawa, and A. Kobayashi. 2014. "HuTman Interaction Issues in a Digital-Physical Hybrid World." In 2014 *IEEE International Conference on Cyber-Physical Systems, Networks, and Applications,* 49-54. https://doi.org/10.1109/CPSNA.2014.17.

Sanna, Andrea, Fabrizio Lamberti, Gianluca Paravati, and Federico Manuri. 2013. "A Kinect-Based Natural Interface for Quadrotor Control." *Entertainment Computing* 4 (3):179-86. https://doi.org/10.1016/j.entcom.2013.01.001.

Waibel, Markus. 2011. "Controlling a Quadrotor Using Kinect." *IEEE Spectrum: Technology, Engineering, and Science News.* Jul. 2, 2011. http://spectrum.ieee.org/automaton/robotics/robotics-software/quadrotor-interaction.

The invention claimed is:

1. A method for remotely controlling an operated unmanned object, the method comprising:
   defining of a set of control movements of an intended operator;
   selecting of minimal necessary signals to reliably acquire the control movements from the operator;
   defining of a mapping of the control movements to commands for the operated unmanned object;
   sensing body movements of the operator; and
   transmitting of the minimal necessary signals corresponding to the movements of the operator to the operated unmanned object.

2. The method of claim 1, wherein the defining of the set of control movements comprises a step of defining of gestures of different body parts.

3. The method of claim 1, wherein the defining of the set of control movements comprises a step of recording of the movements performed by at least one operator observing the operated unmanned object or a virtual representation thereof executing the desired behaviors while executing control movements corresponding to the desired behaviors.

4. The method of claim 1, wherein the operator chooses the set of control movements corresponding to the different actions of the operated unmanned object.

5. The method of claim 1, wherein the step of sensing the body movements of the operator comprises using at least one inertial measurement unit, the method further comprising the steps of:
   determining a subset of discriminant inertial measurement units amongst the inertial measurement units from which gesture data results in at least one command;

identifying a maximum frequency recorded by the subset discriminant inertial measurement units;

turning off the remaining inertial measurement units which do not provide any discriminant feature; and reducing a sampling frequency of the subset of inertial measurement units to a double of the maximum frequency.

6. The method of claim 1, wherein the step of defining of the set of control movements comprises a step of recording of the movements performed by at least one operator observing the operated unmanned object or a virtual representation thereof executing the desired behaviors while executing control movements corresponding to the desired behaviors;

the operator chooses the set of movements corresponding to the different actions of the operated unmanned object;

the method further comprising the step of:

determining a minimum set of signals necessary to acquire and discriminate the body movements of the operator using non-negative sparse principal component analysis.

7. The method of claim 6, further comprising the step of:

determining a mapping of the body movements of the operator to the behaviors of the operated unmanned object.

8. A system of wearable sensors to control a distal robot by a command, the system comprising:

a transmission unit (COM) configured to send the command to the distal robot;

a microcontroller unit (MCU) configured to perform real-time processing;

inertial measurement units (IMU) connected to the microcontroller and configured to capture a gesture from a user and output corresponding gesture data;

wherein the real-time processing comprises:

selecting of minimal necessary signals to reliably acquire control movements from the user;

processing the gesture data and translating the gesture data into the command, adapting a mapping between the gesture of the user and the command; and transmitting, via the transmission unit, the minimal necessary signals corresponding to the movements of the user to the distal robot.

9. The system of claim 8, wherein the system further comprises:

a power consumption control device configured to minimize a power consumption of the inertial measurement units by:

determining a subset of discriminant inertial measurement units amongst the inertial measurement units from which gesture data results in at least one command, identifying a maximum frequency recorded by the subset discriminant inertial measurement units;

turning off the remaining inertial measurement units which do not provide any discriminant feature; and reducing a sampling frequency of the subset of inertial measurement units to a double of the maximum frequency.

\* \* \* \* \*